United States Patent [19]

Ohyama et al.

[11] Patent Number: 5,101,096
[45] Date of Patent: Mar. 31, 1992

[54] OPTICAL RECORDING SHEET AND METHOD AND APPARATUS FOR REPRODUCING THE SAME

[75] Inventors: Shinji Ohyama, Ibaraki; Masahiko Ibamoto, Katsuta; Atsushi Kanke; Tatsuki Inuzuka, both of Hitachi; Masahiro Takasaka, Hitachiota; Nobuyoshi Tsuboi, Ibaraki, all of Japan

[73] Assignee: Hitachi, Ltd., Tokyo, Japan

[21] Appl. No.: 419,727

[22] Filed: Oct. 11, 1989

[30] Foreign Application Priority Data

Oct. 14, 1988 [JP] Japan .................. 63-258600

[51] Int. Cl.⁵ .................................. G06K 7/00
[52] U.S. Cl. .................. 235/436; 235/456; 235/494; 369/275.3
[58] Field of Search ............. 235/436, 454, 456, 487, 235/494, 436; 369/275.3; 364/521

[56] References Cited

U.S. PATENT DOCUMENTS

| | | | |
|---|---|---|---|
| 4,213,040 | 7/1980 | Gokey et al. | 235/487 X |
| 4,652,730 | 3/1987 | Marshall | 235/436 |
| 4,860,275 | 8/1989 | Kakinuma et al. | 235/456 X |
| 4,910,725 | 3/1990 | Drexler et al. | 235/494 X |
| 4,912,311 | 3/1990 | Hasegawa et al. | 369/275.3 X |

*Primary Examiner*—David Trafton
*Attorney, Agent, or Firm*—Antonelli, Terry, Stout & Kraus

[57] ABSTRACT

An optical recording sheet includes a plurality of data columns consisting of optical recording dots arranged in a matrix shape and column markers corresponding to the data columns. The data columns and the column markers of the optical recording sheet are detected by an optical line sensor and stored in a memory. On the basis of information stored in the memory, a marker detector detects the column marker and then two memory coordinates having a position known relative to the column marker are calculated. From the two memory coordinates, an inclining angle detector calculates the inclining angle between the optical recording sheet and the optical line sensor. On the basis of the memory coordinates and the inclining angle, an address calculator restores the optical recording dots stored in the memory coordinates.

2 Claims, 10 Drawing Sheets

OPTICAL RECORDING SHEET AND METHOD AND APPARATUS FOR REPRODUCING THE SAME

BACKGROUND OF THE INVENTION

This invention relates to an optical recording sheet having information stored by optical recording dots, and a reproducing method and a recording apparatus for the recording sheet, and particularly relates to an optical recording sheet having optical recording dots arranged in a matrix shape, and a reproducing method and a reproducing apparatus for the recording sheet.

In the prior art, the reading of optical recording dots in a disc-shaped recording medium as represented by a compact disc (CD) and a video disc as disclosed in the Japanese magazine Electronics (published on May, 1983, pages 27-54) is carried out by providing a spiral groove in an optical disc and tracing the groove. That is, the tracking of a reading head is of mechanical type.

Further, in an optical card having optical recording dots arranged in a matrix shape, as disclosed, for example, in U.S. Pat. No. 4,634,850, an electrical tracking depending on data (ROM) read by an optical lines sensor is adopted as disclosed in Japanese laid-open patent publication JP-A-62-110628, or Nikkei Electronics (published on July 29, 1985, pages 99-101).

In the electrical tracking as mentioned above, it is difficult to recognize an address of arrangement of bits read by an optical sensor while the sensor is reading the address.

Further, when the arrangement of bits of data and the line sensor are inclined, there is a problem that a method of correcting the inclination is not sufficient and hence the accuracy of reading data is low.

Still further, there is another problem that a recording medium itself is expanded or diminished in size in an upward and downward direction or in a right and left direction and hence the accuracy of reading data is reduced.

SUMMARY OF THE INVENTION

An object of this invention is to provide an optical recording sheet permitting accurately reading dot information without utilizing a complicated mechanism, and a reproducing method and a reproducing apparatus for the recording sheet.

In order to solve the above mentioned object, in this invention, an optical recording sheet is constituted by a plurality of optical recording dots arranged in a matrix shape and provided for indicating information such as image picture and audio sound, and in order to discriminate data columns arranged in a column direction of said optical recording dots from adjacent data columns, a column marker is arranged in the same column as the data column. In the optical recording sheet, information is stored, and the data column and the column marker are read by an optical line sensor and stored in a memory.

The feature of this invention is that two memory coordinates having a position known relative to the column marker are calculated, and from the two memory coordinates, an inclining angle between the optical recording sheet and the optical recording sensor is calculated, and on the basis of the memory coordinates and the inclining angle, the optical recording dots stored in the memory are restored.

According to the constitution of this invention, the functional effect as mentioned below is obtained.

(1) In the optical recording sheet, the column marker is provided in order to discriminate the data columns from the adjacent data columns and hence an address of the data column read by the line sensor can be simply and accurately recognized.

Accordingly, an access time is shortened and failure of reading data can be prevented.

(2) From the two memory coordinates having a position known relative to the column marker, the inclining angle between the optical recording sheet and optical line sensor is calculated and hence even when the data column and the line sensor are inclined, the inclination is corrected through a brief operation and the reading and reproduction can be accurately carried out.

Accordingly, it is not necessary to provide a complicated mechanism and failure of reading data can be prevented.

DESCRIPTION OF THE PREFERRED EMBODIMENTS

Hereinafter, one embodiment of this invention is described with reference to the drawings.

Figure 1:
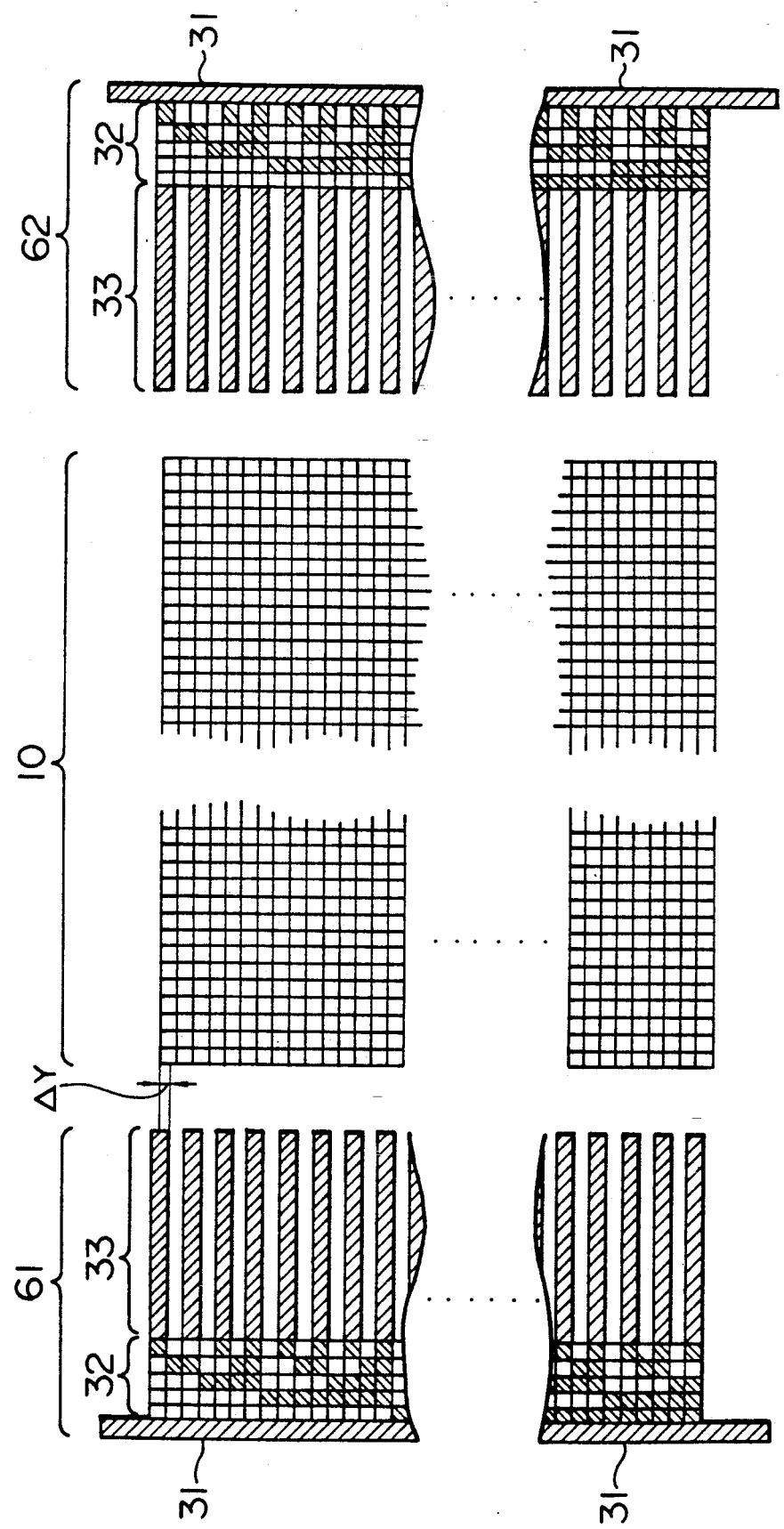
FIG. 1 shows a first embodiment of a dot pattern of an optical recording sheet according to this invention.

FIG. 1 shows a pattern of dot information stored on a surface of an optical recording sheet, and a scan of respective columns by means of a CCD line sensor 21 (FIG. 2) described later is carried out from a left side to a right side and from a upward side to downward side of the drawings.

The pattern of dot information is formed by a data region 10 where main data indicative of audio sound and picture image are stored, and a left marker region 61 and a right marker region 62 (hereinafter, left and right marker regions are generally referred to as a marker region 6) respectively provided at a left side and a right side of the data region 10.

The marker region 6 is provided for accurately recognizing the position at which the CCD line sensor is scanning, and for correcting the scan to accurately carry out the reading of data when the scan is incliningly carried out relative to the arrangement of data. The marker region is one of features of this invention.

Hereinafter, it is described in detail how the marker region 6 is utilized.

At left and right sides of the data region 10, the left marker region 61 and the right marker region 62 are respectively arranged, each of which is formed by end lines 31, a column address 32 and a column marker 33.

The column address 32 and the column marker 33 are respectively arranged correspondingly to each of the data columns within the data region 10.

The end line 31 is provided for determining the region where the information is stored, and between the left and right end lines 31 stored are various kinds of dot information such as the main data, column address The column address 32 is provided for determine an address of the data stored in the data region 10, and the value of the address indicates that of an address of the data column stored on a straight line connecting a left column address and a right column address with each other in the data region 10.

The column marker 33 functions as a mark for detecting an inclining angle between a scan line direction (main scan direction) of the CCD line sensor 21 and a direction of arrangement of dot information.

In an example according to the inventors of this application, the size of one dot of the data forming the data region 10 and the column address 32 is 20×20 (μm).

Further, in this case, a difference between a center position of the data column in a longitudinal direction (auxiliary scan direction) and a center position of the column marker 33 and the column address 32 corresponding to the data column in a longitudinal direction, that is, a difference ΔY between an extended line of the boundary between adjacent column markers and a center line of the data column corresponding to one of the adjacent column markers (in this embodiment, an upper side column marker) is set to be 10 μm (in general, ½ of the size of one dot forming the data column). According to such setting, the position where the column address 32 is changed, that is, the position where the color of the column marker 33 is changed from black to white in the longitudinal direction is a center position of the data column corresponding to the black-colored column marker.

In general, when a position is detected by an optical sensor, it is easiest to detect the position where the color is changed. Accordingly, as mentioned above, the column marker 33 and the data column corresponding to the column marker are arranged in the auxiliary direction and then the dots forming the data column which is to be read can be detected in the center position of the dot and the position detection is carried out in a short time and accurately.

Further, as mentioned above when the address of the data column is stored in the column address 32, it is useful for a random search. However, it is not necessary to provide the address correspondingly to all of the data columns and practically it is sufficient to provide the address in a predetermined interval.

Figure 2:
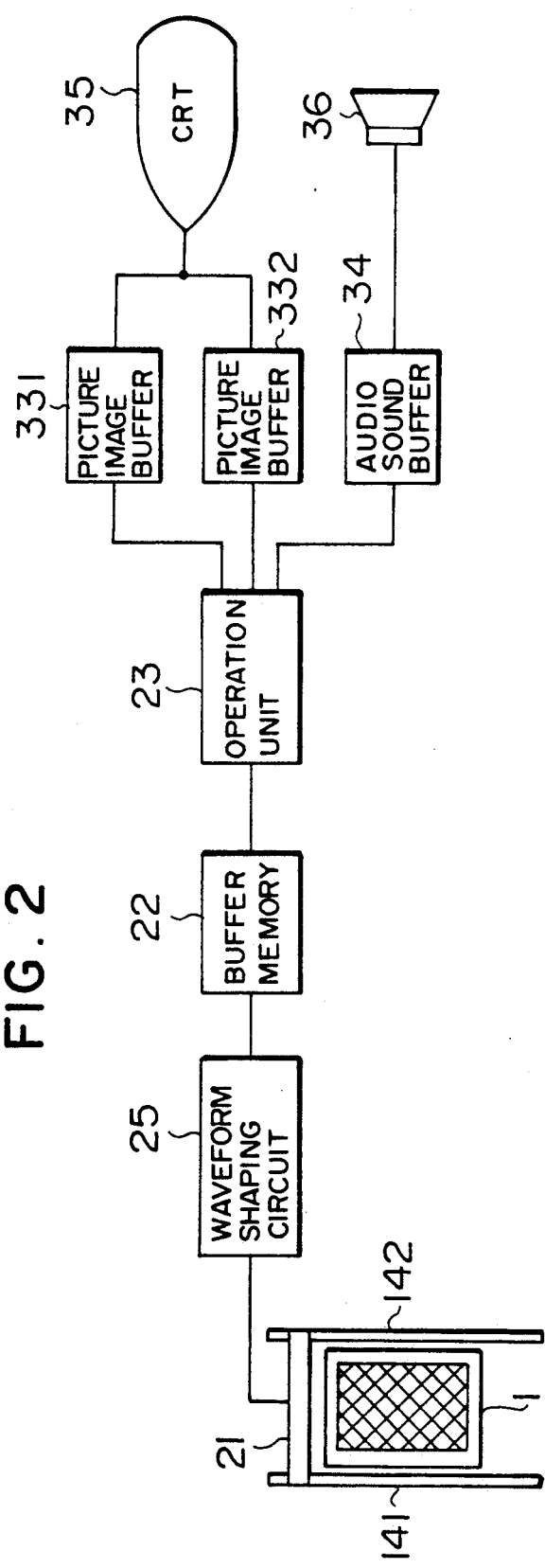
FIG. 2 shows a block diagram of a reproducing apparatus for an optical recording sheet according to this invention.

FIG. 2 is a block diagram showing one embodiment of a reproducing apparatus for an optical recording sheet according to this invention, which is particularly suitable for the optical recording sheet of this invention as shown in FIG. 1.

In FIG. 2, it is the CCD line sensor 21 provided parallely and movably on left and right rails 141 and 142 that reads dot information stored in the optical recording sheet 1.

The line sensor 21 is gradually moved (scanned in an auxiliary direction) over the optical recording sheet 1 and simultaneously an electronic scan (main scan) by CCD is carried out, and then the dot information stored on the optical recording sheet 1 can be scanned from the upside to the downside sequentially.

The CCD line sensor 21 serially produces an output voltage corresponding to the presence or absence, or the dark or light color, of the dots. The output voltage is converted into a digital signal of a binary value or a multi-value through a waveform shaping circuit 25, which is in turn stored in a buffer memory 22.

An operational device 23 carries out a various kinds of correction and operations as described later with reference to FIG. 7 and produces a reproduction picture image and audio sound signal, and particularly is constituted by a unit for calculating memory coordinates of two points the position of which are already known relative to the column marker, a unit for calculating an inclining angle between the optical recording sheet and the line sensor from the memory coordinates of the two points, and a unit for restoring the optical recording dots stored in the buffer memory 22 on the basis of the memory coordinates and the inclining angle.

The picture image and audio sound signals reproduced by the operational device 23 are led to output buffer memories 331, 332 and 34.

The output buffer memories 331 and 332 are used as picture image buffer memories, and upon termination of writing to one of the memories the output is provided to a CRT 35 so that during reproduction of one picture image information the other picture image information can be displayed.

An audio sound information of an audio sound buffer memory 34 is produced from a loudspeaker 36.

Figure 3:
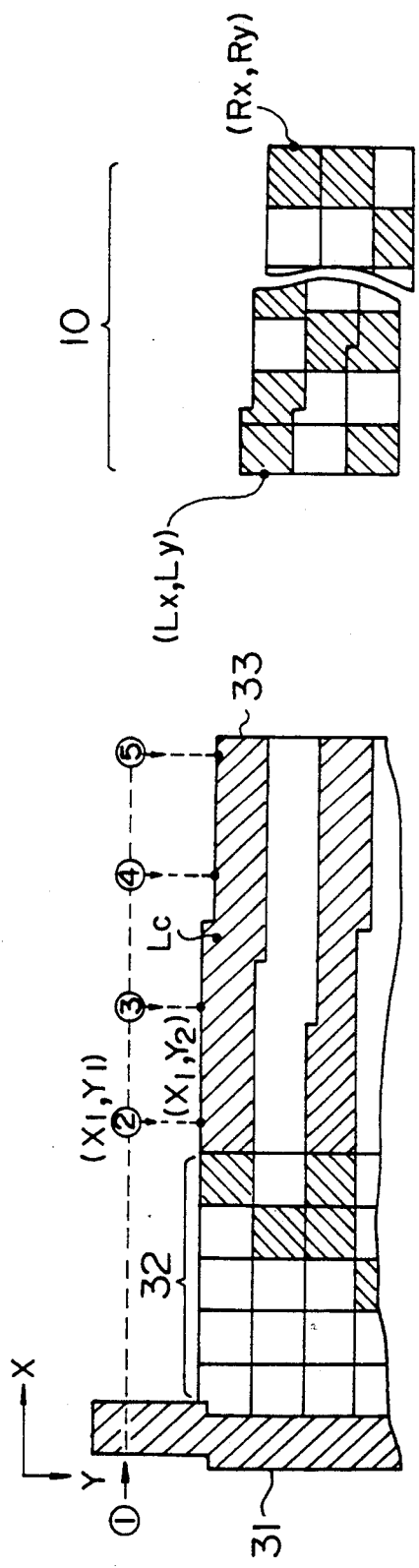
FIG. 3 shows a dot pattern in a buffer memory.

FIG. 3 is a sketch diagram showing a data recorded state within the buffer memory 22 when the optical recording sheet 1 having the constitution as shown in FIG. 1 is read by the CCD line sensor 21 and the binary signal is written in the buffer memory 22.

In FIG. 3, particularly it is shown that the scan of the CCD line sensor 21 is carried out at an inclining angle relative to a direction of arrangement of dot information, and several stepped portions shown in FIG. 3 are produced owing to the inclining reading.

Figure 4:
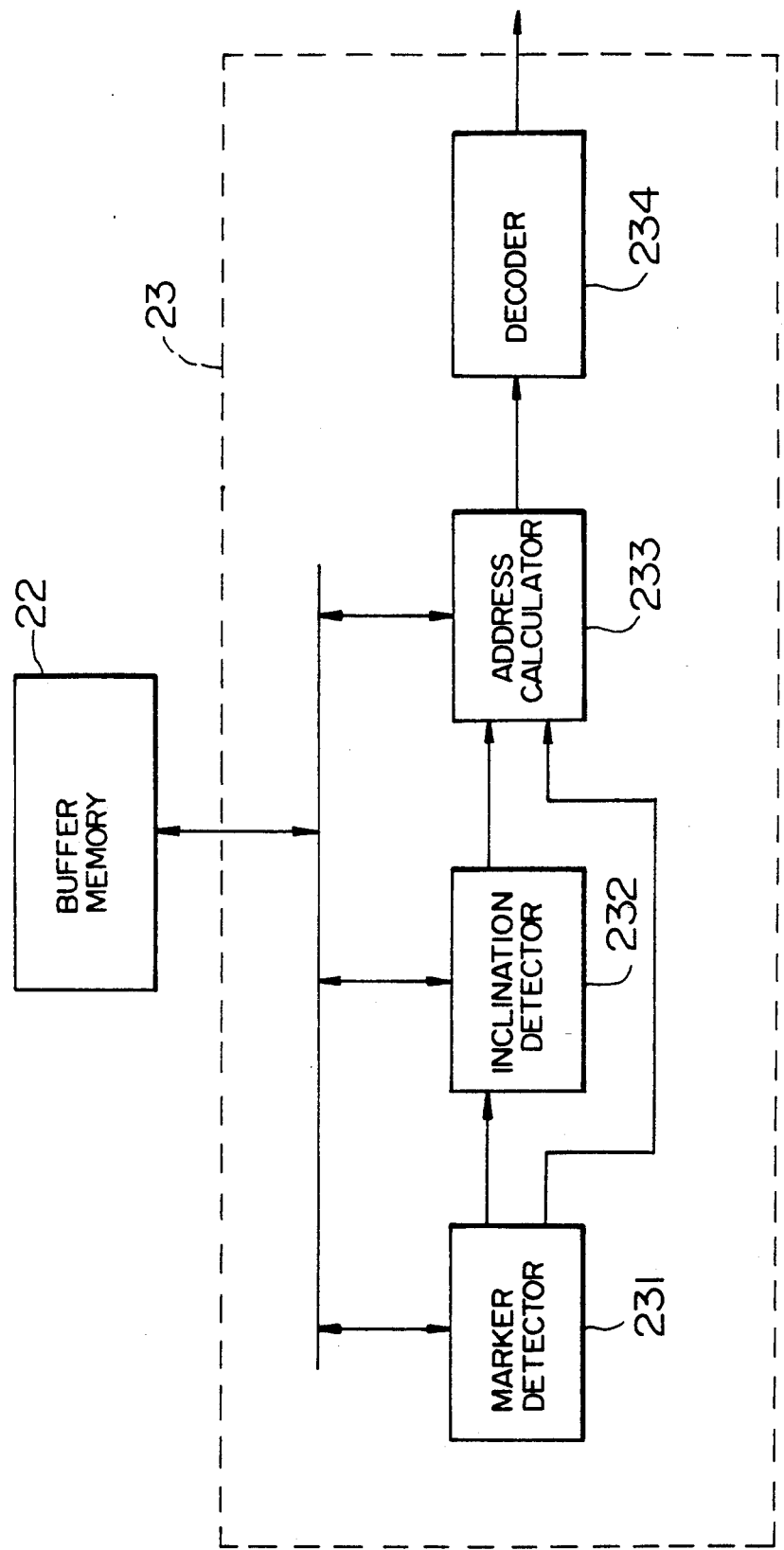
FIG. 4 shows a block diagram of a calculation device of the recording apparatus of FIG. 2.
Figure 5A:
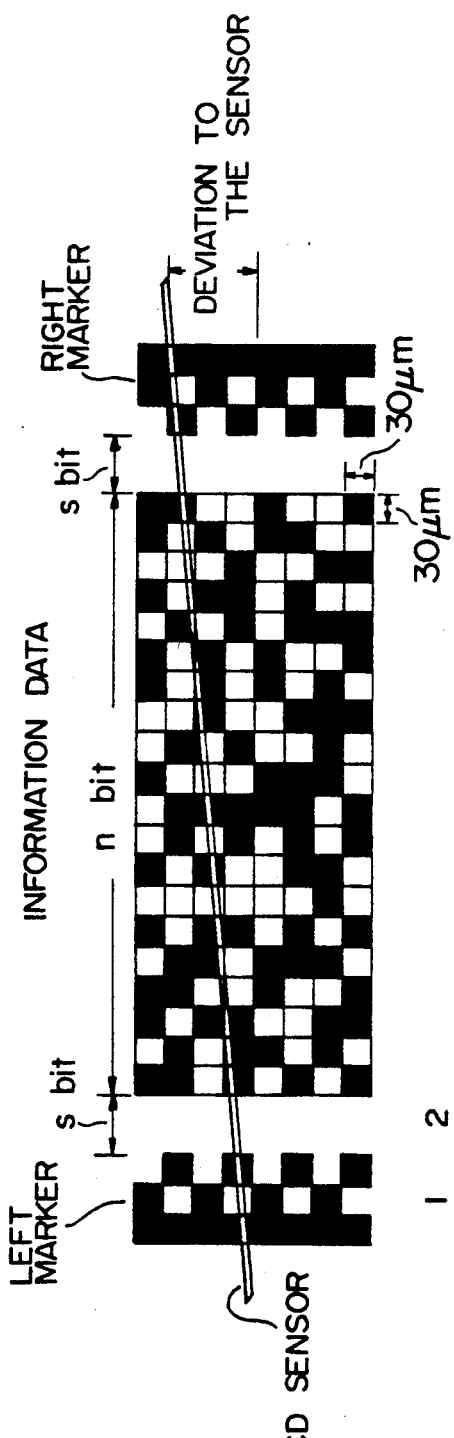
FIG. 5(a) shows the relation between data recorded in the optical recording sheet and a CCD sensor.

FIG. 4 shows a block diagram of the operational device of FIG. 2. The operational device 23 includes a marker detector 231, an inclining detector 232, an address calculator 233 and a decoder 234. The marker detector 231 detects corresponding left and right markers of the optical recording sheet on the basis of data stored in the buffer memory 22 and calculates coordinates (an address) in the buffer memory. That is, in FIG. 5(b), the position of a left marker is searched by detecting a point where the color is changed from white to black from an upward and a left side direction in the buffer memory 22 and then an upward and left edge of the marker is detected. From this reference point, a distance is travelled by 45 μm (=30+30/2) in a rightward direction and searched in a downward direction, and then a first left marker is detected. In this case, it is noted that the change of color from white to black and the change of color from black to white are different at an odd number marker and an even number marker. A first right marker is also detected in the same way as described above, and a marker following the first marker is likewise detected. The left and right markers are of comb shape as shown in FIG. 5(a) and therefore it is also utilized that the color of a portion $l_1$ and a portion $l_2$ in the same column is changed from white to black and from black to white.

The marker detector 231 detects the corresponding left and right markers and then the address of the markers in the memory is applied to the inclining detector 232. As shown in FIG. 5(c), the inclining detector 232 calculates the inclining angle from $\theta = \tan^{-1}((X_R - X_L)/(Y_R - Y_L))$. The marker addresses and the inclining angle data are respectively applied from the marker detector 231 and the inclining detector 232 and the position of these information data (address in the memory) is calculated.

Figure 5B:
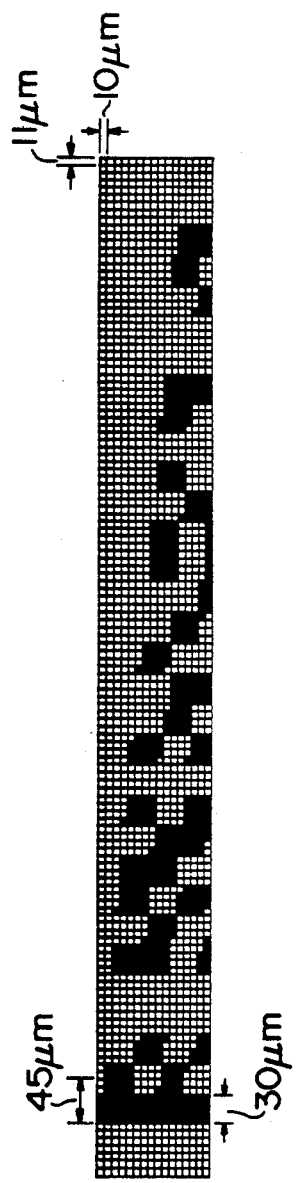
FIG. 5(b) shows a dot pattern in a buffer memory.
Figure 5C:
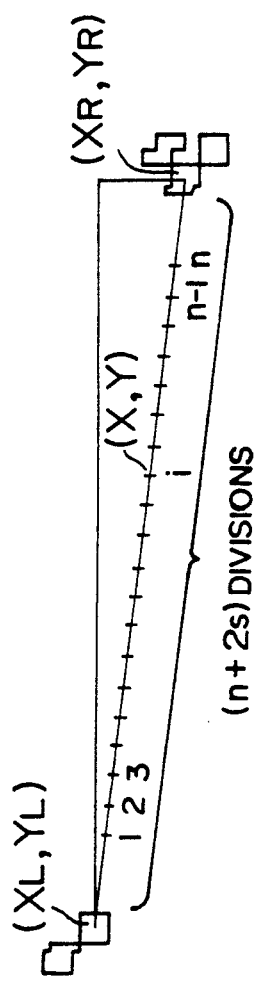
FIG. 5(c) shows a correction of inclination.

As described above, the feature of this invention is that the data processings are all calculated in the buffer memory as shown in FIG. 5(b), that is, in an imaginary space. The outputting and inputting of these data are carried out through a data bus.

Another feature of this invention is that the address of each dot position is calculated by the address calculator 233 and data having redundancy in the buffer memory 22 is compressed into one-bit data (1/0) when the address data is read from the buffer memory 22. In the buffer memory 22, one dot is expressed by the cells of a $3 \times 3$ matrix and at the output of the address calculator, it is converted into one-bit information.

The information of such a bit sequence as picture image or audio sound information may be applied directly to the output buffers 331, 332 and 34, or the information of an original picture image and an audio sound signal may be precompressed and then expanded by the decoder 234.

Figure 7:
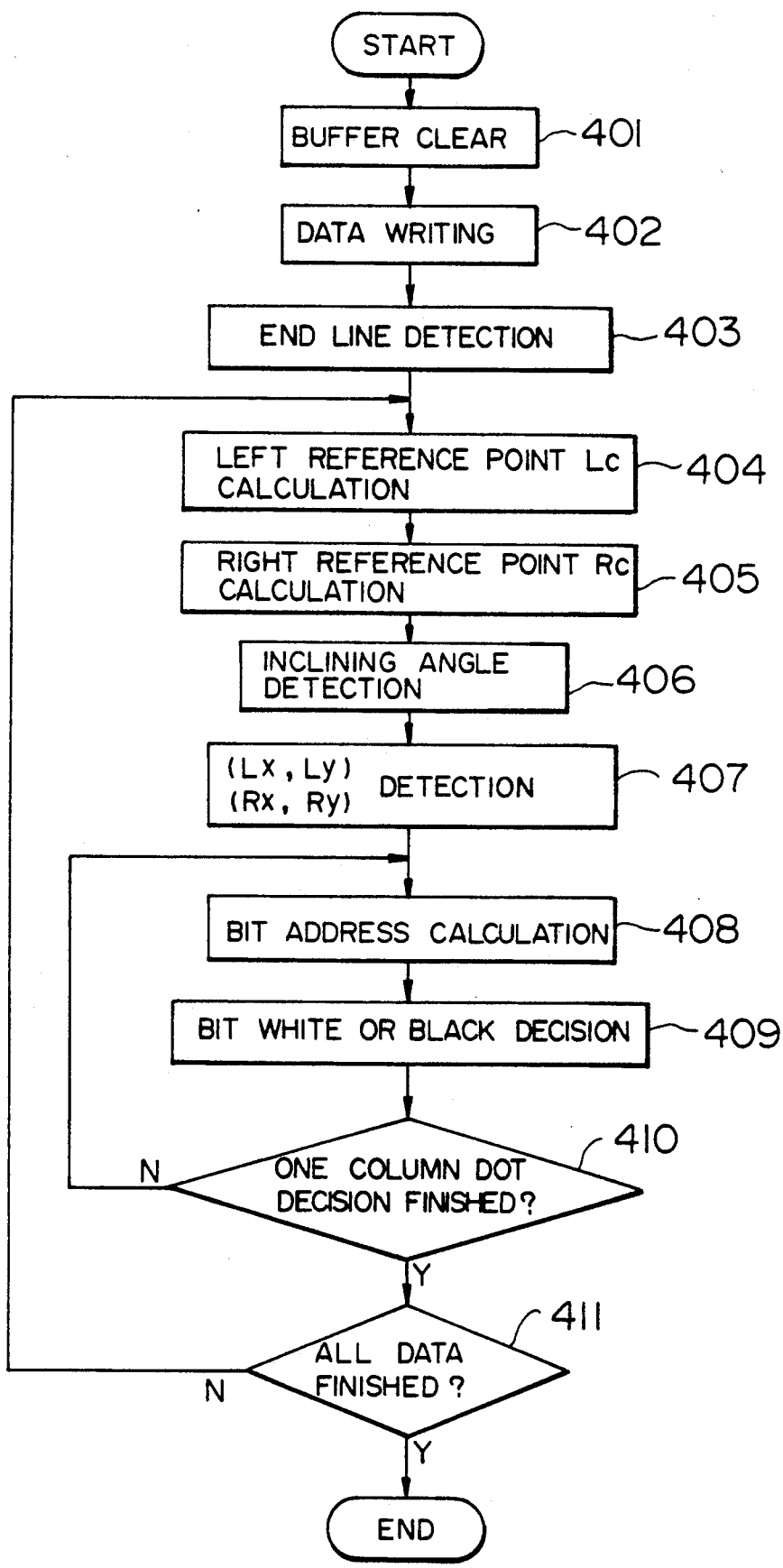
FIG. 7 shows a flow chart of a reproducing method for the optical recording sheet according to this invention.

Hereinafter, referring to a flow chart of FIG. 7, is described an operating method of correcting deviations of read data occurring due to the stepped portions from the dot information stored as shown in FIG. 3 and of restoring arrangement of original data.

When the operation is started, a step 401 makes clear the data of the reading buffer 22.

In a step 402, the optical line sensor 21 scans a distance corresponding to a plurality of data columns and the data scanned is written in the buffer 22. The arrangement of dots thus written is shown in FIG. 3.

In a step 403, the data is checked from the left side of bits within the buffer 22 toward a right direction ① (X-axis direction) of FIG. 3. At this time, the position where white is first changed to black indicates the end line 31 and the memory coordinates of this position are stored as a side end of the optical recording sheet 1.

In a step 404, a left reference point $L_c$ is calculated. For this purpose, from the position corresponding to a left end of the end line 31 detected in the step 403, in a right direction, at least through the end line 31 and the column address 32, to the position ② reaching upstream of the column marker 33, the data checking position is moved.

In the experiment of the inventors of this application, as shown in FIG. 3, one dot of data on the optical recording sheet 1 has the size of $20 \times 20$ μm and the end line 31 has the width of one dot and the column address 32 has the length of five dots, and hence the data checking position is moved up to the position corresponding at least to the distance of $20 \times 6 = 120$ μm.

One cell of the buffer 22 corresponds to one cell of the CCD line sensor 21 one by one and accordingly when one cell of the CCD line sensor 21 has the size of $5 \times 5$ μm, the data check position is moved by more than 24 ($=120/5$) addresses in conversion into the cells of the buffer 22. In the experiment of this application, the data check position is moved by 25 addresses.

Figure 6:
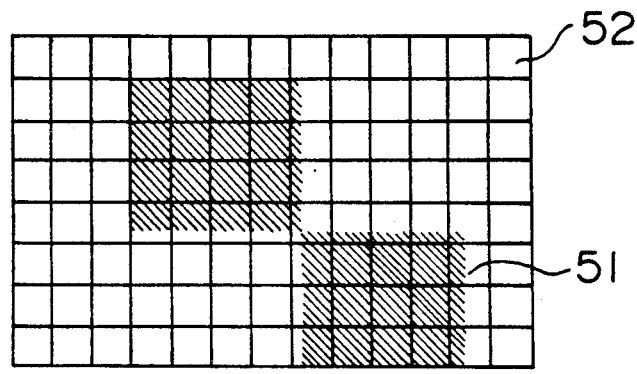
FIG. 6 shows the relation between one cell of a line sensor and a dot pattern.

Now we assume that the memory coordinates of the data check position ② are $(X_1, Y_1)$. FIG. 6 shows the dimensional relation between dots 51 and cell 52 of the CCD line sensor 21.

From the position ② moved by 25 addresses as described above, the data is checked in a downward direction (Y-axis direction) of the drawings, and then it is a first column marker that changes first to black. We assume that the memory coordinates of this position are $(X_1, Y_2)$.

Further, at the positions ③, ④ and ⑤ respectively moved in a right direction by 10, 20 and 30 addresses from the memory coordinates $(X_1, Y_1)$, the data are checked in a downward direction of the drawings as described above, and the coordinates of a position which changes first to be black are calculated and stored.

As shown in FIG. 3, Y-coordinates of a position where a column marker appears in a downward direction from the position ③ are same as those of the position moved in a downward from the position ②, but Y-coordinates of the positions where the column marker appears from the positions ④ and ⑤ are larger than those of the positions ② and ③ by one bit.

Accordingly, Y-coordinates of the positions where the column marker appears from the positions ③, ④ and ⑤ are respectively (X1+10, Y2), (X2+20, Y2+1), (X1+30, Y2+1).

An average value of X-axis direction and Y-axis direction from the positions ③, ④ and ⑤ is calculated as described below.

An average value of X-axis direction $(X1+X1+10+X1+20+X1+30)/4 = X1+15$

An average value of Y-axis direction $(Y2+Y2+Y2+1+Y2+1)/4 = Y2+0.5 \doteq Y2+1$

The memory coordinates that this average value indicates is set to be a left reference point $L_c$ of a first column data.

A similar procedure is followed in a step 405 to calculate a right reference point $R_c$.

A first left and a first right reference point $L_c$ and $R_c$ are calculated, and then X-coordinates of start point of the end line on the same Y-coordinates as those of the respective reference points $L_c$ and $R_c$ are detected. If there is a difference between the values of both coordinates, then it is decided that the end line is inclined, and the memory coordinates of each reference point are modified on the basis of the difference, and the memory coordinates modified are restored as restored memory coordinates. In a step 406, an inclining angle between both reference points is calculated on the basis of the reference points and after this step, in a step 407, the memory coordinates $(L_x, L_y)$ and $(R_x, R_y)$ of the left and right side ends of the first column data are calculated on the basis of the inclining angle.

The memory coordinates $(L_x, L_y)$ and $(R_x, R_y)$ are easily calculated by a known calculating method from the width of data region 10 and the width between the data region 10 and the marker region 6.

When the memory coordinates ($L_x$, $L_y$) and ($R_x$, $R_y$) are calculated, a step 408 calculates an address of bits storing dot information forming a data column on the basis of the memory coordinates and the inclining angle. Such a calculating method is also known.

The memory coordinates ($L_x$, $L_y$) and ($R_x$, $R_y$) and the address of bits are calculated by a similar calculation, and as one example, a method of calculating the address (memory coordinates) of bits storing a given dot information on the basis of the memory coordinates ($L_x$, $L_y$) and ($R_x$, $R_y$) is described below.

Assuming that the memory coordinates of left and right side ends of the first column data are respectively ($L_x$, $L_y$) and ($R_x$, $R_y$), the inclining angle $\theta$ between the data column and the line sensor is calculated as shown below.

$$\theta = \tan^{-1}\{(R_y - L_y)/(R_x - L_x)\}$$

Further, assuming that the size of one dot corresponds to 4×4 of cells of the line sensor, i.e., 4×4 of cells of the buffer memory, a distance $S_1$ up to a center position of the n-th dot from the memory coordinates ($L_x$, $L_y$) is calculated as indicated below.

$$S_1 = (4 \times n) - 2$$

From the calculation of the inclining angle $\theta$ and the distance $S_1$ as described above, the memory coordinates ($X_n$, $Y_n$) of a center position of the n-th dot from the memory coordinates ($L_x$, $L_y$) calculated as follows.

$$X_n = L_x + \cos\theta \times S_1$$

$$Y_n = L_y + \sin\theta \times S_1$$

In such a calculation method, in case the data column and the CCD line sensor are not parallel with each other, it happens that the end line sensor is also slightly displaced in a right or a left direction. In such a case, the value of the memory coordinates ($L_x$, $L_y$) and ($R_x$, $R_y$) is calculated and correctly read out.

In a step 409, it is decided whether bits of the address calculated in the step 408 are white or black and on the basis of the result it is decided whether the desired dots are white or black.

In a step 410, it is decided whether the white and black decision relative to all of the dots forming the first column data is terminated or not.

When the decision of the first column dots is terminated, a step 411 decides whether the white and black decision of dots of all data columns is terminated or not. When the decision is not terminated, the processings of the steps 404-410 are repeated, and similarly as described above, the white and black decision relative to a second column data, a third column data and so on is made. When the white and black decision relative to all of the column data is terminated, the processings is terminated.

According to the reproducing method of this invention, the address of data columns read by the line sensor can be easily calculated by a simple method and further the inclining correction can be also carried out, thus permitting accurate data reading without providing a complicated tracking mechanism.

Figure 8:
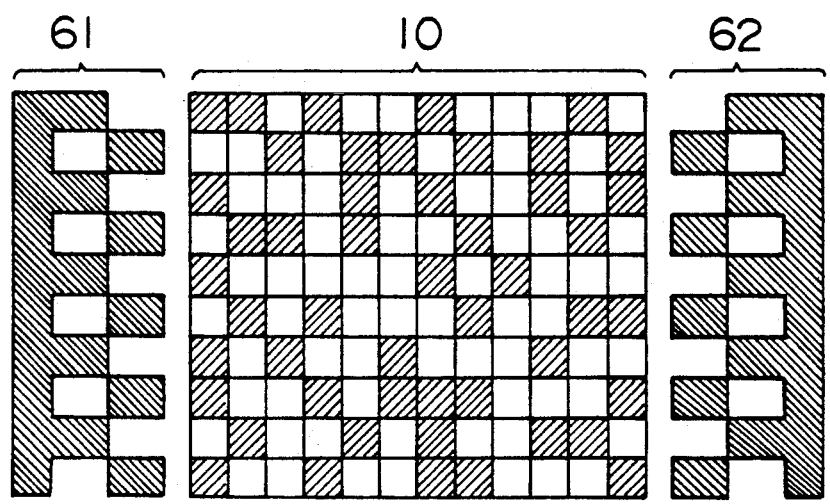
FIG. 8 shows a second embodiment of the optical recording sheet of this invention.

FIG. 8 shows a pattern of arrangement of the data and marker and the marker 6 is arranged in a comb-teeth shape and the column marker has a dark color portion and a light color portion succeeding to the dark color portion. Lacking of provision of the column address is the feature of this embodiment.

According to the second embodiment, the position of one data column is indicated by both white and black column markers and hence the column marker can be easily detected without adjusting accurately a threshold level of a binary signal. Further, when a start point of the marker 6 is first detected and the moved amount from the start point is counted one column by one column, then the address is known from the moved amount without providing a column address.

In the embodiments described with reference to FIGS. 1, 3 and 8, the marker is arranged at the right and left side of the data region. However, the marker may be arranged at either one of the right and left sides and two reference points are provided within one column marker and an inclining angle is calculated on the basis of the reference points.

Figure 9:
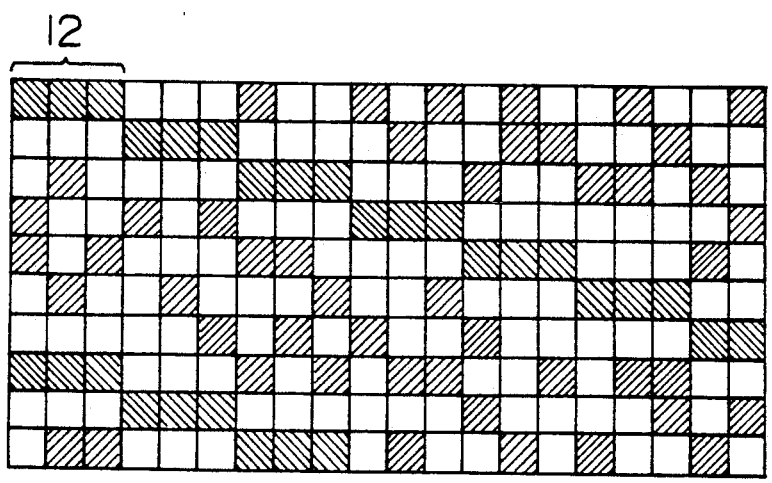
FIG. 9 shows a third embodiment of the optical recording sheet of this invention.

FIG. 9 shows the arrangement of data and markers according to a third embodiment of the optical recording sheet of this invention.

In the third embodiment, three black dots (dots indicated with slant lines in a right downward direction in the Figure) succeedingly connected in the data region are designated as the column marker 12.

Also in the third embodiment, the region of three black dots is detected and identified as a column marker, and two memory coordinates having a position known respective to the column marker are calculated according to the same reproducing method as described with reference to FIG. 7 and then the dot information can be accurately read out.

Still further, according to the third embodiment, it is not necessary to provide the marker region and hence the integration of data can be increased.

Figure 10:
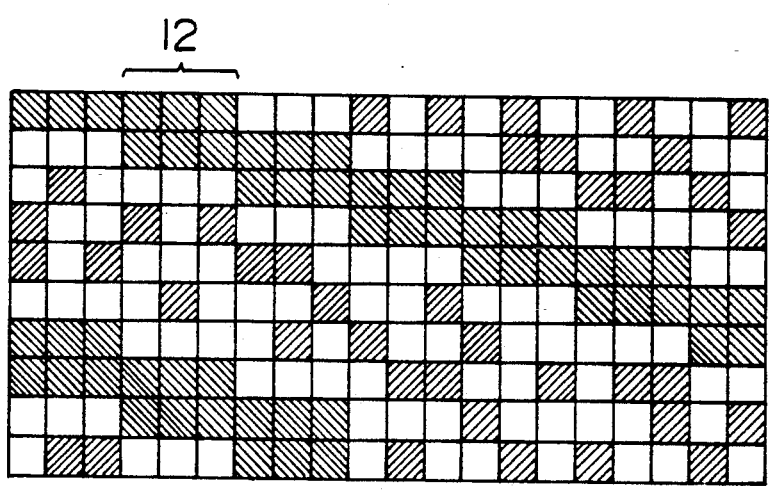
FIG. 10 shows a fourth embodiment of the optical recording sheet of this invention.

FIG. 10 shows the arrangement of data and markers according to a fourth embodiment of the optical recording sheet of this invention.

In the fourth embodiment, the feature is that a marker 12 is arranged so that a portion of a column marker of adjacent rows is placed at the same bit position as the preceding column marker, and it is same as in the above mentioned embodiment that the region of a black bit consisting of six dots is detected and identified as column marker, and, two memory coordinates are calculated and then the dot information is accurately read out.

According to the fourth embodiment, the area occupying the column marker is larger and the increase of integration is prevented, but the detection of the marker is facilitated and accurate and hence the dot information is read out further accurately and in a short time.

Figure 11:
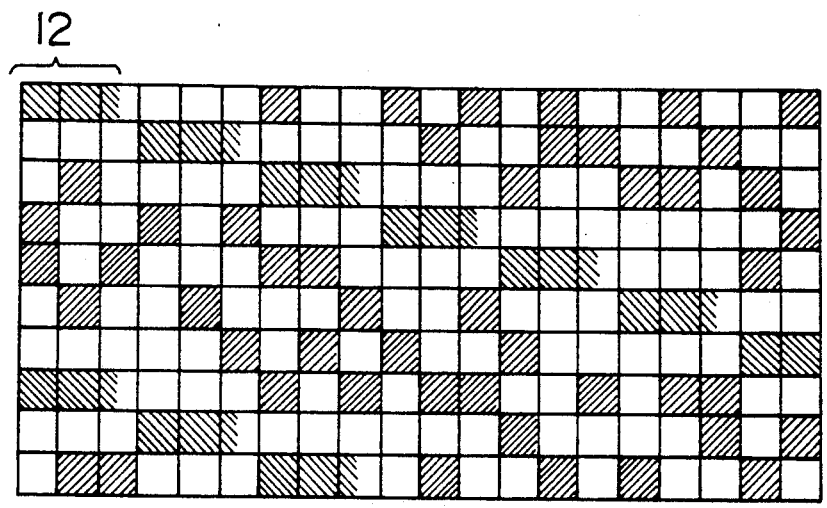
FIG. 11 shows a fifth embodiment of the optical recording sheet of this invention.

FIG. 11 shows the arrangement of data and marker of a fifth embodiment of the optical recording sheet according to this invention.

In the fifth embodiment, the feature is that the data region of 2.5 dots is utilized as column marker 12, and it is also same as in the above mentioned embodiment that the region of 2.5 black dots is detected and identified as a column marker and two memory coordinates are calculated and then the dot information is accurately read out.

According to the fifth embodiment, the column marker has the length of non-integer dots and hence the arrangement of data is not defined and the discrimination of the column marker from the data column is possible.

Figure 12:
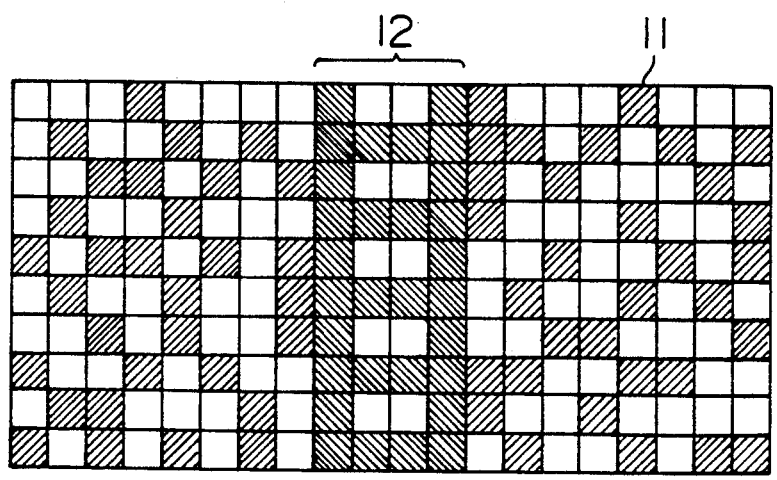
FIG. 12 shows a sixth embodiment of the optical recording sheet of this invention.

FIG. 12 shows the arrangement of data and markers of a sixth embodiment of the optical recording sheet according to this invention.

In the sixth embodiment, the marker 12 is arranged at a center portion of the data region 10 and yet the shape of the marker is made different on every other column to discriminate the even columns from the odd columns.

According to the sixth embodiment, the discrimination of the even columns from the odd columns is facilitated and hence the discrimination between adjacent data columns is easy.

In the embodiments described with reference to FIGS. 9 to 12, it is needless to say that the arrangement of dots indicative of the main data and the arrangement of dots indicative of the column markers are respectively discriminated clearly.

Further, in the embodiments described with reference to FIGS. 8, 9, 10, 11 and 12, the column address is not arranged, but this invention is not limited to these embodiments and the region of several dots succeedingly connected to the column marker can be utilized as a column address.

In this case, the identification of the column marker facilitates the identification of the column address and hence the address of data columns read by the line sensor can be simply and accurately recognized, similarly to the embodiments described with reference to FIGS. 1 and 3.

As apparent from the description as mentioned above, according to the embodiments, the effects as described below are obtained.

(1) The column marker arranged at every data column is provided and hence the address of a data column read by the line sensor can be simply and accurately recognized.

Accordingly, the access time is shortened and the failure of reading data can be prevented.

(2) Two memory coordinates known to a position relative to the column marker are calculated and from the memory coordinates is obtained by calculation an inclining angle between the optical recording sheet and the optical sensor. On the basis of the inclining angle, the optical recording dots stored in the memory are restored and hence the inclination can be corrected by simple calculation even when the arrangement of data and the line sensor are inclined.

Accordingly, failure of reading data can be prevented without providing a complicated tracking mechanism.

(3) The marker 6 is arranged in a comb-teeth shape and the position of one data column is indicated by a marker of both black and white colors and hence the detection of the marker is facilitated without adjusting accurately a threshold level of a binary signal.

(4) The shape of column markers is made different on every other column and hence the discrimination of an even column from an odd column is facilitated and the discrimination between adjacent data columns is made easy.

Figure 13:
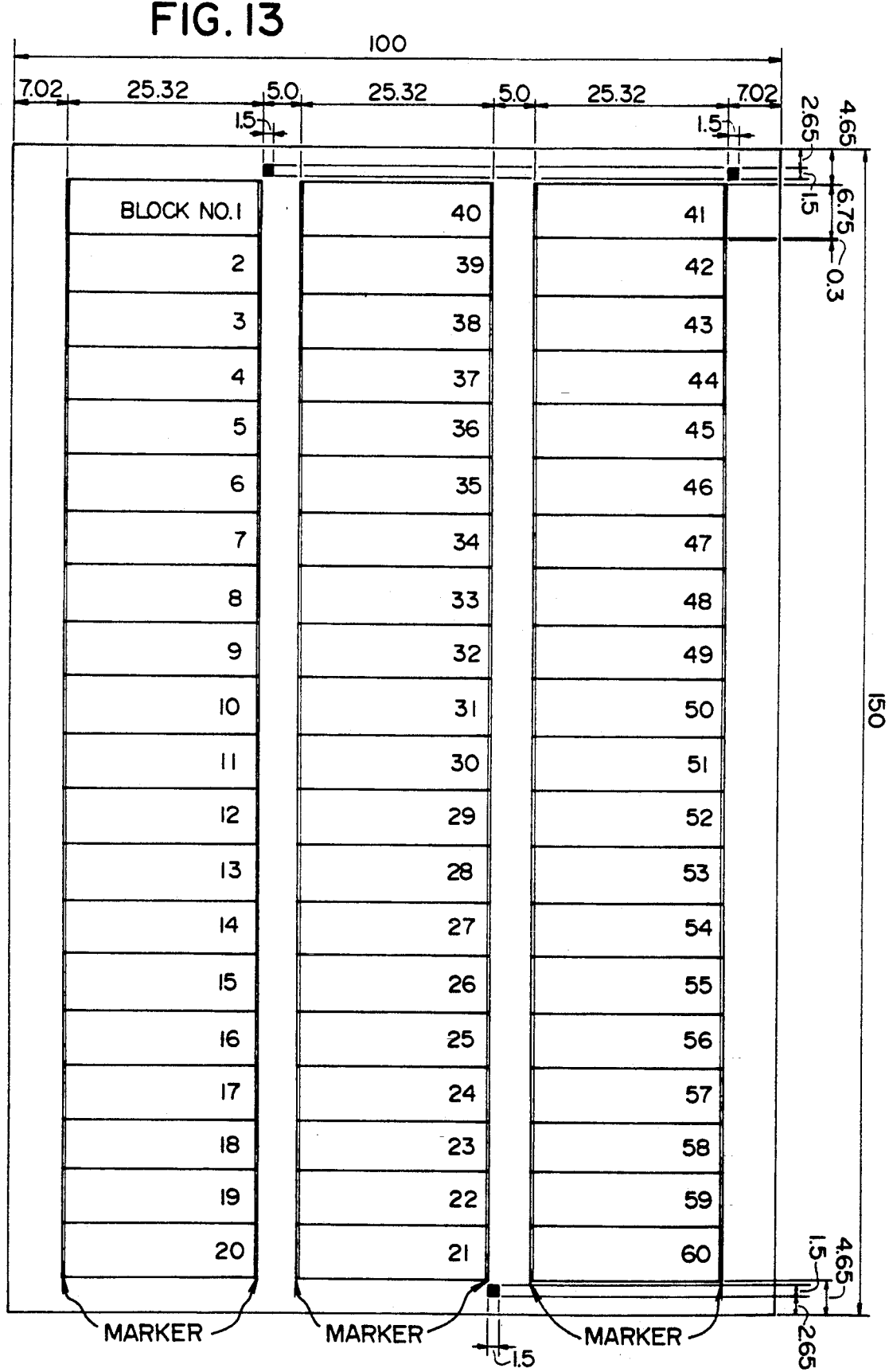
FIG. 13 shows the arrangement of data blocks of an optical post card to which the optical recording sheet of this invention is applied.
Figure 14:
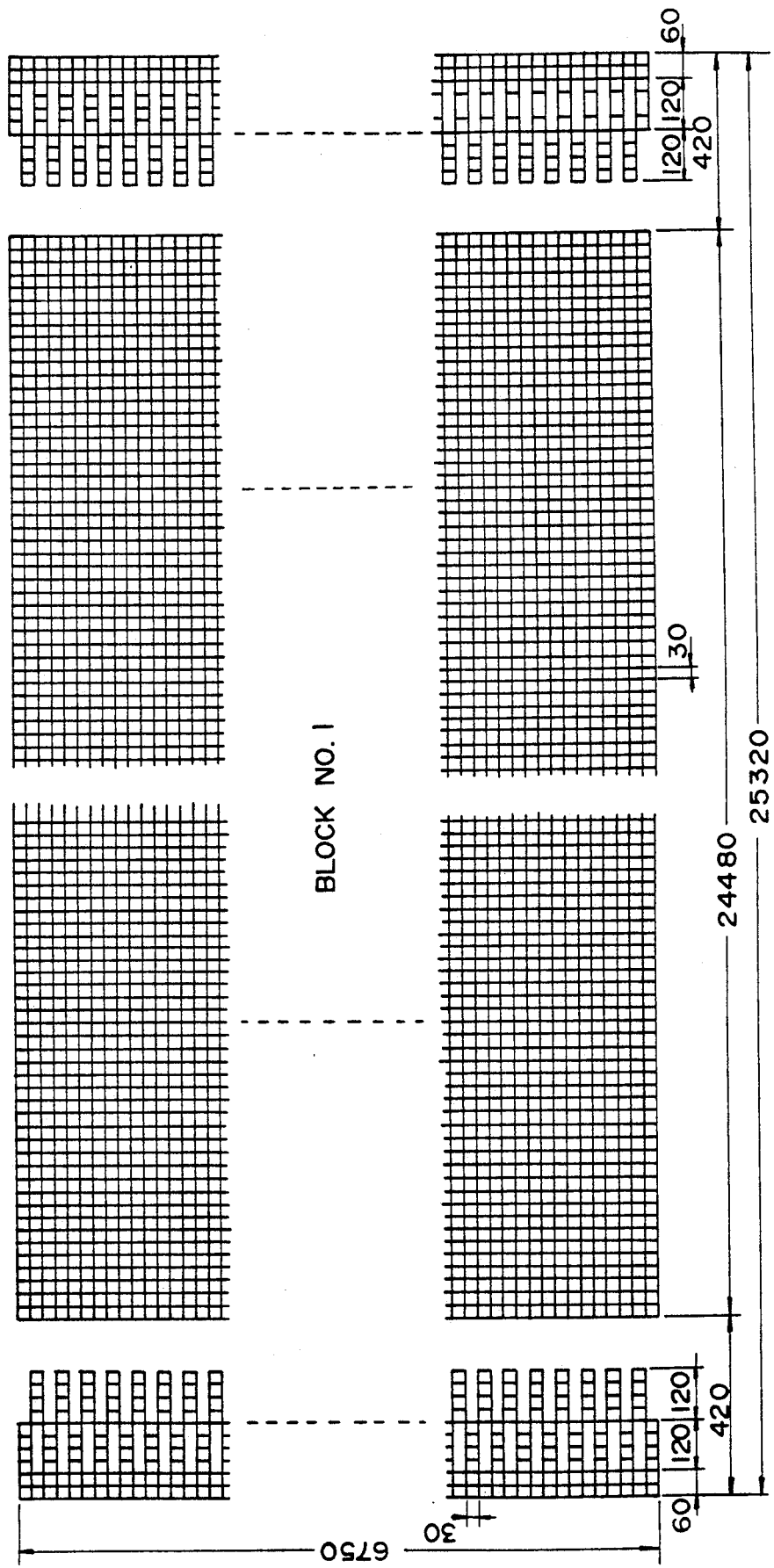
FIG. 14 shows the constitution of one data block of FIG. 13.

Referring to FIGS. 13 and 14, one embodiment of an optical post card to which the optical recording sheet of this invention is applied will be described.

FIG. 13 shows the arrangement of data of the whole optical post card. FIG. 14 shows the constitution of one data block of the optical post card. As shown in FIG. 13, one surface of the optical post card includes 60 data blocks in all which are arranged in three rows. One data block has the capacity capable of recording one still picture and audio sound of about four seconds, that is, about 20K bytes. Accordingly, in one optical post card, the information corresponding to 60 data blocks, for example, 10 still pictures and audio sound of about four minutes can be recorded.

In FIG. 14, one data block of FIG. 13 is shown in detail. The data block includes a marker arranged at right and left and information data arranged at the center of the marker, and formed in the same manner as in the embodiment of FIG. 8. A bit length of information data is determined by a length of the CCD sensor which is to read data and the content of data which is to be recorded, i.e., a compression code and an error correction code and so on.

In this invention, the sensor 21 is capable of using, in addition to the CCD line sensor, a magnetic sensor when the dot pattern is magnetically recorded. Further, even when the dot pattern is optically recorded, in addition to the CCD line sensor, for example, a surface sensor can be used in reading. In this case, the data as shown in FIG. 5(b) can be directly obtained. Still further, as carried out in the CD (compact disc), it is possible that light from a laser diode is irradiated on the optical recording sheet and the reflected light is read by an optical sensor of a single head. In this case, the single head must be scanned two-dimensionally.

We claim:

1. A method of reproducing an optical recording sheet having a plurality of data columns arranged in a matrix shape and read by an optical line sensor and column markers corresponding to said data columns comprising the steps of:

storing said data columns and said column markers in a memory;

calculating two memory coordinates having a position known relative to each of the column markers;

calculating an inclining angle between the optical recording sheet and the optical line sensor from said two memory coordinates; and restoring the optical recording dots stored in said memory on the basis of said memory coordinates and said inclining angle.

2. A reproducing apparatus for an optical recording sheet having a plurality of optical recording dots arranged in a matrix shape, and column markers arranged in the same columns as data columns arranged in a column direction of said optical recording dots comprising:

an optical line sensor for detecting said data columns and said column markers;

a memory for storing an output signal of said optical line sensor;

first operating means for detecting said column markers in an imaginary space on the basis of information stored in said memory, and calculating two memory coordinates having a position known relative to each of the column markers;

second operating means for calculating an inclining angle between the optical recording sheet and the optical sensor from said two memory coordinates; and third operating means for restoring the optical recording dots stored in said memory on the basis of said memory coordinates and said inclining angle.

* * * * *